United States Patent [19]
Aoki et al.

[11] Patent Number: 5,658,131
[45] Date of Patent: Aug. 19, 1997

[54] ELECTRIC PUMP CONTROL SYSTEM

[75] Inventors: Yasushi Aoki; Takeshi Ohba; Yukihisa Ishii; Hiroyuki Matsuo, all of Saitama, Japan

[73] Assignee: Honda Giken Kogyo Kabushiki Kaisha, Tokyo, Japan

[21] Appl. No.: 404,874

[22] Filed: Mar. 16, 1995

[30]     Foreign Application Priority Data

Mar. 16, 1994  [JP]  Japan ..................... 6-045468

[51] Int. Cl.$^6$ ................................ F04B 49/06
[52] U.S. Cl. ............................. 417/44.2; 417/17
[58] Field of Search ............... 417/44.2, 17, 12, 417/53, 63; 303/10, 11, DIG. 4, 122.12, 122.09

[56]            References Cited

U.S. PATENT DOCUMENTS

| | | | |
|---|---|---|---|
| 4,525,125 | 6/1985 | Matsumoto et al. | 417/44.3 |
| 5,317,870 | 6/1994 | Inagawa | 60/418 |
| 5,364,173 | 11/1994 | Wada et al. | 303/11 |
| 5,369,349 | 11/1994 | Tsuchiya et al. | 318/811 |
| 5,373,454 | 12/1994 | Kanda et al. | 364/551.01 |
| 5,413,404 | 5/1995 | Inagawa | 303/92 |

FOREIGN PATENT DOCUMENTS

| | | |
|---|---|---|
| 4238770 | 8/1992 | Japan . |
| 4345568 | 12/1992 | Japan . |

*Primary Examiner*—Timothy Thorpe
*Assistant Examiner*—Xuan M. Thai
*Attorney, Agent, or Firm*—Lyon & Lyon LLP

[57]            ABSTRACT

An electric pump is turned ON and OFF by a main drive circuit including a negative pressure sensor for detecting a negative pressure in an accumulator, a first relay and a control device, and also turned ON and OFF by a back-up drive circuit including a negative pressure switch for detecting a negative pressure in an accumulator, and a second relay. For a period from the starting of the electric pump by the back-up drive circuit to the stopping of the electric pump by the main drive circuit, there is a period during which the electric pump is being driven only by the back-up drive circuit and a period during which the electric pump is being driven only by the main drive circuit. For each of these periods, a trouble of the main drive circuit and/or the back-up drive circuit can be determined by reference to a check signal indicative of the operational state of the electric pump. Thus, it is possible to reliably detect a trouble with the driving of the electric pump connected to the accumulator.

9 Claims, 8 Drawing Sheets

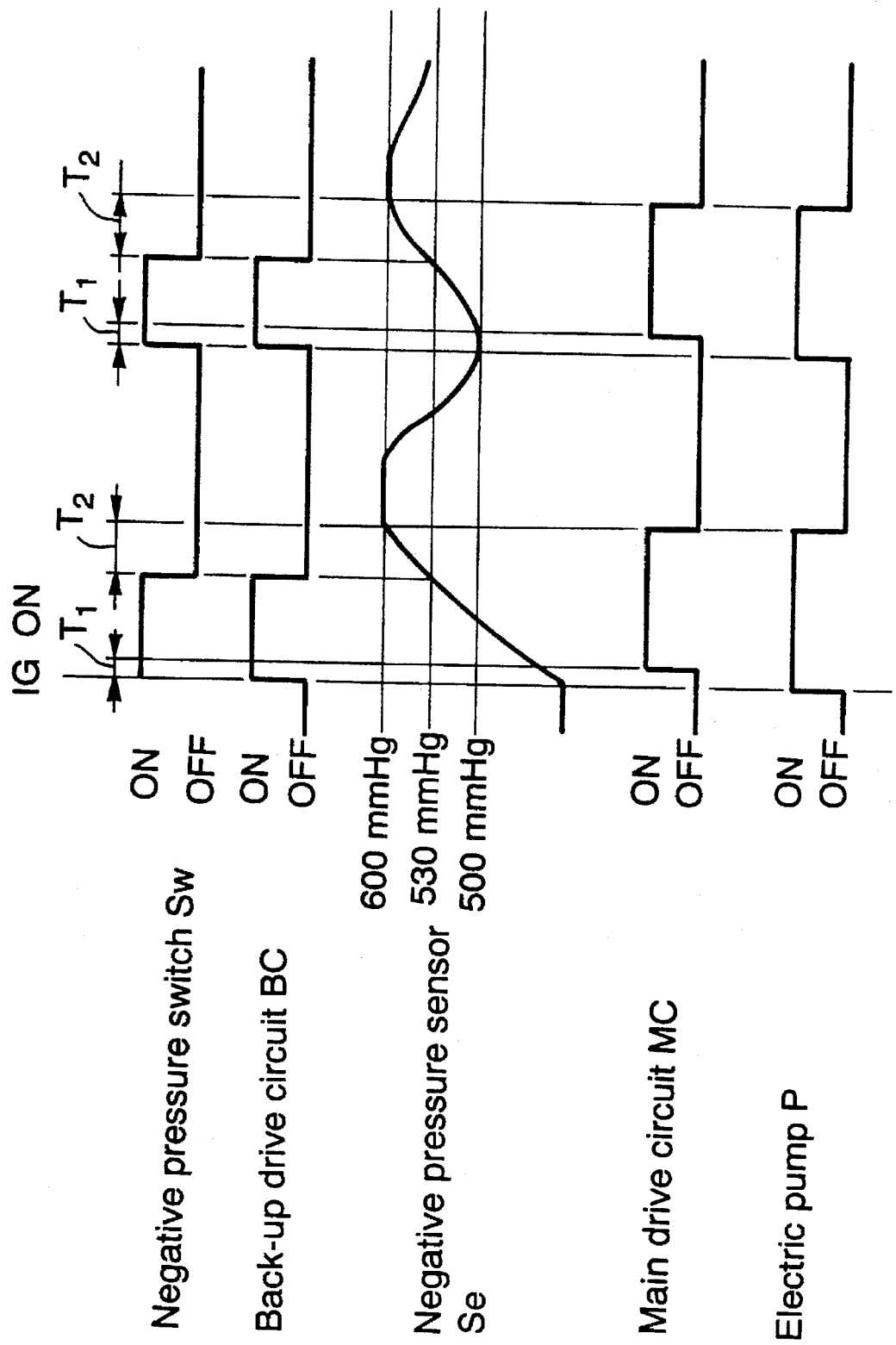

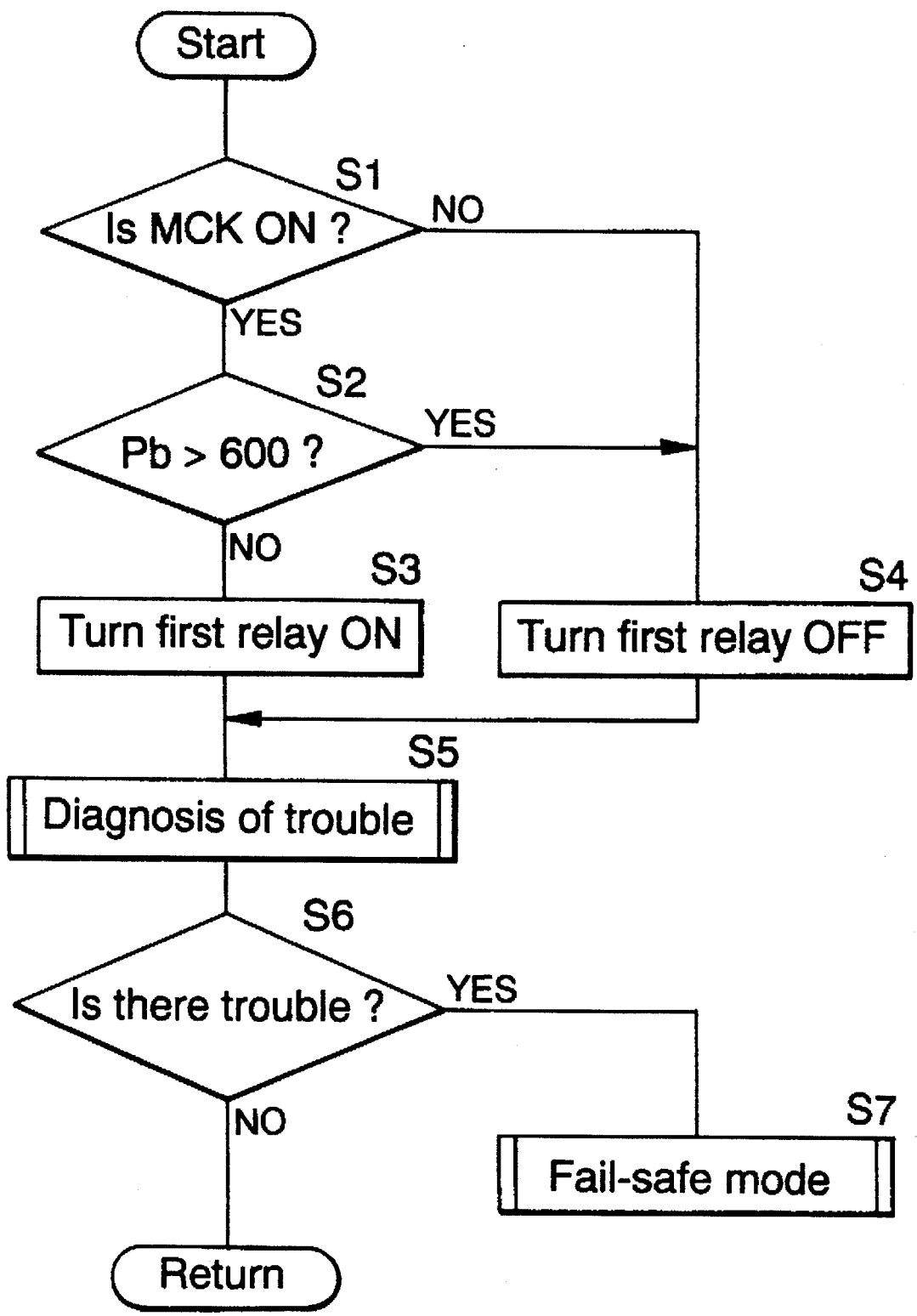

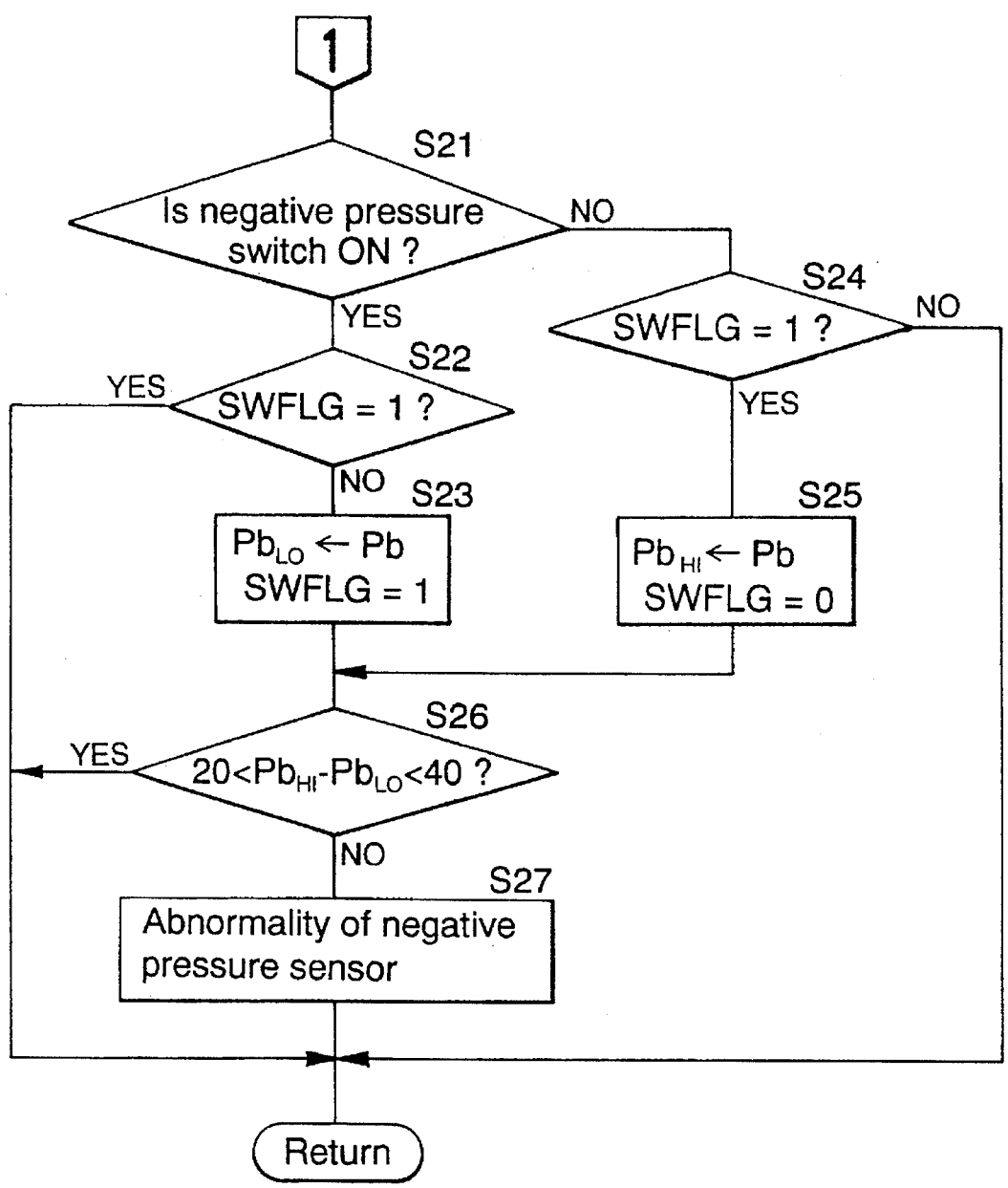

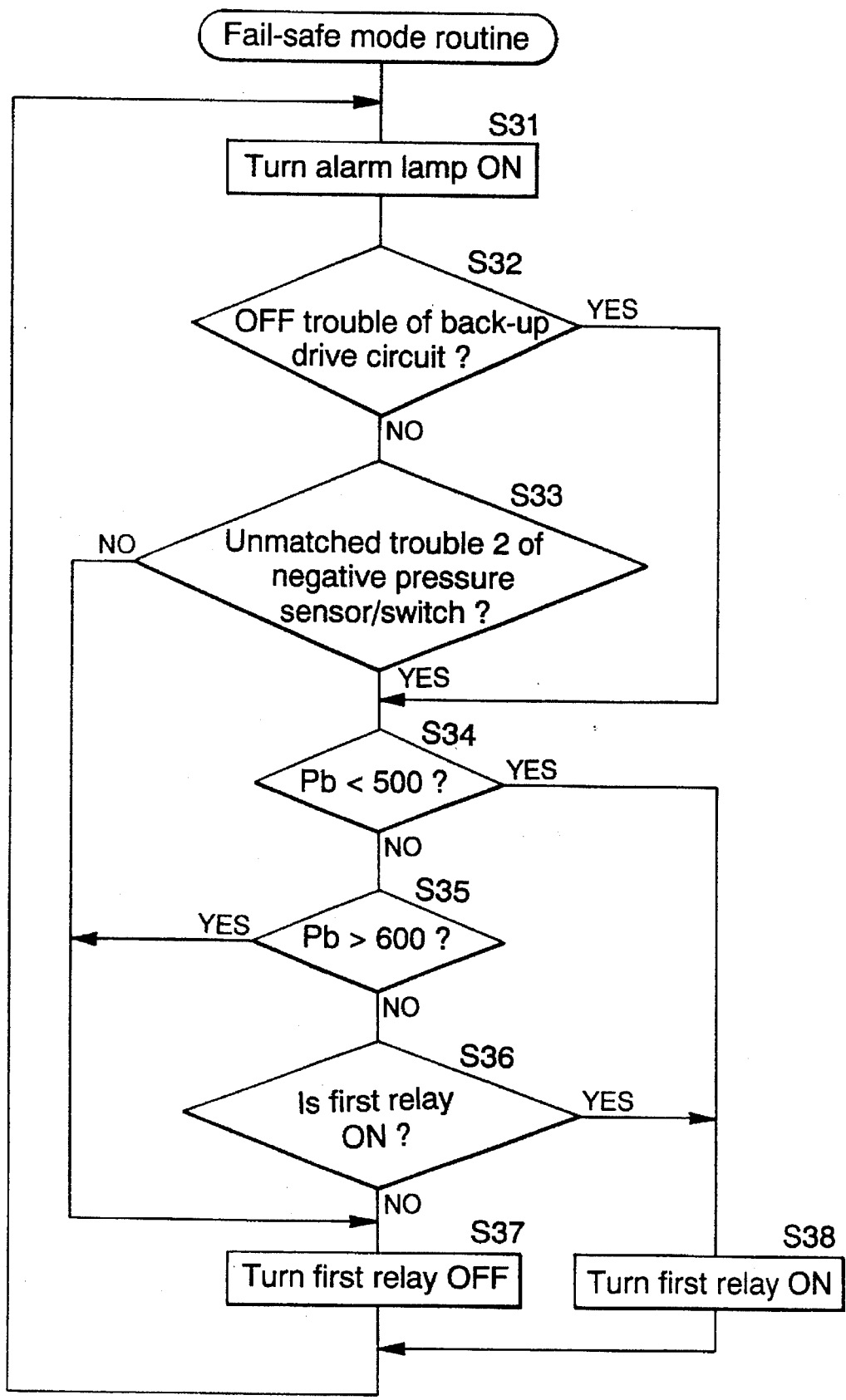

ELECTRIC PUMP CONTROL SYSTEM

BACKGROUND OF THE INVENTION

1. Field of the Invention

The present invention relates to an electric pump control system for controlling the operation of an electric pump connected to an accumulator.

2. Description of the Prior Art

There are conventionally known electric pump control systems for controlling the operation of an electric pump connected to an accumulator, which are described in Japanese Patent Application Laid-open Nos. 238770/1992 and 345568/1992.

The electric pump control system described in Japanese Patent Application Laid-open No. 238770/1992 has two series of means for detecting the pressure in the accumulator and pump driving circuits, and is capable of appropriately controlling the pump, even if one series develops a trouble.

The electric pump control system described in Japanese Patent Application Laid-open No. 345568/1992 employs both a pressure switch and a pressure sensor as means for detecting the pressure in the accumulator, and is capable of detecting troubles of these pressure detecting means.

In general, the control system using two pressure detecting means in parallel relation suffers from a problem that even if one of the pressure detecting means develops a trouble, the electric pump can be driven and stopped and hence, the trouble with one pressure detecting means cannot be easily detected. On the other hand, the control system in which only when one of the pressure detecting means is in trouble is the back-up performed by the other pressure detecting means, the following problem is encountered: only an output signal from the one pressure detecting means is used and an output signal from the other pressure detecting means is not used and for this reason, the trouble with the other pressure detecting means cannot be easily detected.

SUMMARY OF THE INVENTION

Accordingly, it is an object of the present invention to accurately detect a trouble with the pressure detecting means in an electric pump control system to provide an enhanced reliability.

To achieve the above object, according to a first aspect and feature of the present invention, there is provided an electric pump control system, comprising an electric pump for pumping a fluid, an accumulator connected to the electric pump, a first pressure detecting means for detecting a pressure in said accumulator, a second pressure detecting means for detecting a pressure in said accumulator, a first drive circuit for directly driving and stopping the electric pump based on an output signal from the first pressure detecting means, and a second drive circuit for driving and stopping the electric pump based on an output signal from the second pressure detecting means and an output signal from a control means which has a trouble detecting function; wherein the timing of driving and stopping the electric pump by the second drive circuit is different from the timing of driving and stopping said electric pump by said first drive circuit, thereby providing a time for which the electric pump is being driven only by the first drive circuit and a time for which the electric pump is being driven only by the second drive circuit, during one driving run of the electric pump.

With the above first feature of the present invention, while the electric pump is being driven by the first drive circuit, a trouble with the first drive circuit including the first pressure detecting means can be reliably detected. In addition, while the electric pump is being driven by the second drive circuit, a trouble with the second drive circuit including the second pressure detecting means can be reliably detected. Moreover, during one driving run of the electric pump, the first and second drive circuits are necessarily operated and therefore, it is possible to detect a trouble early.

In addition to the first feature, according to a second aspect and feature of the present invention, the control means is supplied with an output signal from the first pressure detecting means and a check signal indicative of a command to judge the driving and stopping of the electric signal.

With the above second feature of the present invention, it is possible to further accurately detect a trouble by comparing the output signals from the first and second pressure detecting means with the check signal.

In addition to the first feature, according to a third aspect and feature of the present invention, at least one of the first and second pressure detecting means is an analog sensor.

With the above third feature of the present invention, it is possible to detect a break trouble or a short-circuit trouble of the analog sensor by monitoring an output signal from the analog sensor.

The above and other objects, features and advantages of the invention will become apparent from the following description of the preferred embodiment taken in conjunction with the accompanying drawings.

BRIEF DESCRIPTION OF THE DRAWINGS

FIG. 4 is a timing chart for explaining the operation of the electric pump;

FIG. 5 is a flow chart of a main routine;

FIG. 7 is a second portion of the flow chart of the subroutine of step S5 in the main routine;

FIG. 8 is a flow chart of a subroutine of step S6 in the main routine; and

DESCRIPTION OF THE PREFERRED EMBODIMENT

The present invention will now be described by way of a preferred embodiment applied to a negative pressure source for a brake device in a vehicle in connection with the accompanying drawings.

Figure 1:
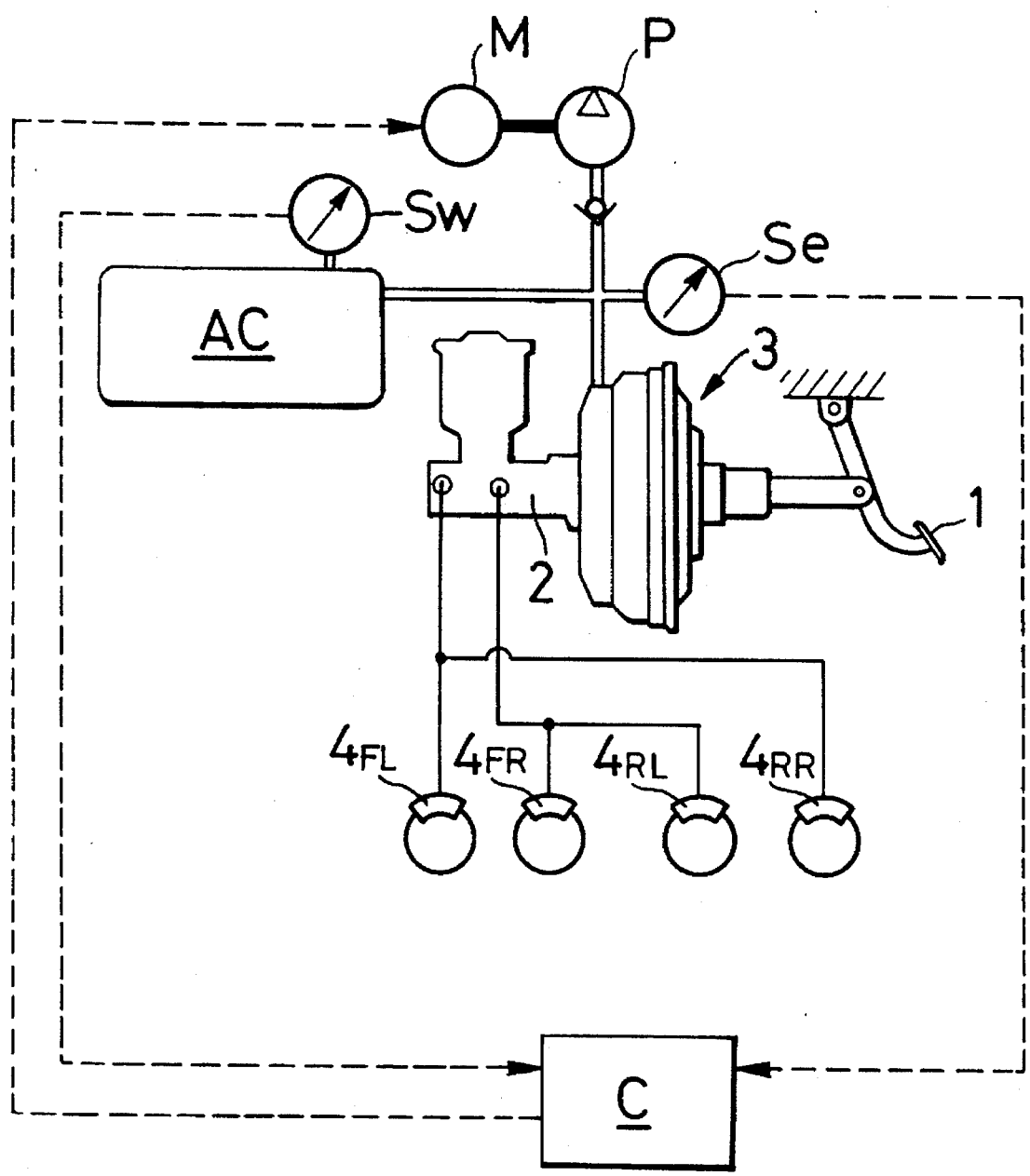
FIG. 1 is a diagrammatic illustration of a brake device for a vehicle.

Referring first to FIG. 1, a negative pressure booster 3 is provided between a brake pedal 1 and a master cylinder 2 for boosting the depression force on the brake pedal 1 to transmit it to the master cylinder 2. The hydraulic braking pressure produced by the master cylinder 2 is transmitted to brake calipers $4_{FL}$ and $4_{FR}$ of front wheels and brake calipers $4_{RL}$ and $4_{RR}$ of rear wheels to brake the front and rear wheels.

An electric pump P including a vacuum pump for depressurizing an accumulator AC is connected to a pipe line which connects the negative pressure booster 3 and the accumulator AC. The electric pump P is driven by a motor M. The negative pressure in the accumulator AC is detected by a negative pressure switch Sw as a first pressure detecting means and a negative pressure sensor Se as a second pressure detecting means. A control device C as a control means controls turning ON or OFF the electric pump P (i.e., the operation of the motor M) based on an output signals from the negative pressure switch Sw and sensor Se.

If the negative pressure in the accumulator AC is reduced and becomes lower than a lower limit value by the operation of the negative pressure booster 3, the electric pump P is driven to depressurize the accumulator AC. As a result, if the negative pressure in the accumulator AC is increased and exceeds an upper limit value, the electric pump P is stopped, thereby causing the negative pressure in the accumulator AC to be maintained in a predetermined range between the lower and upper limit values.

Figure 2:
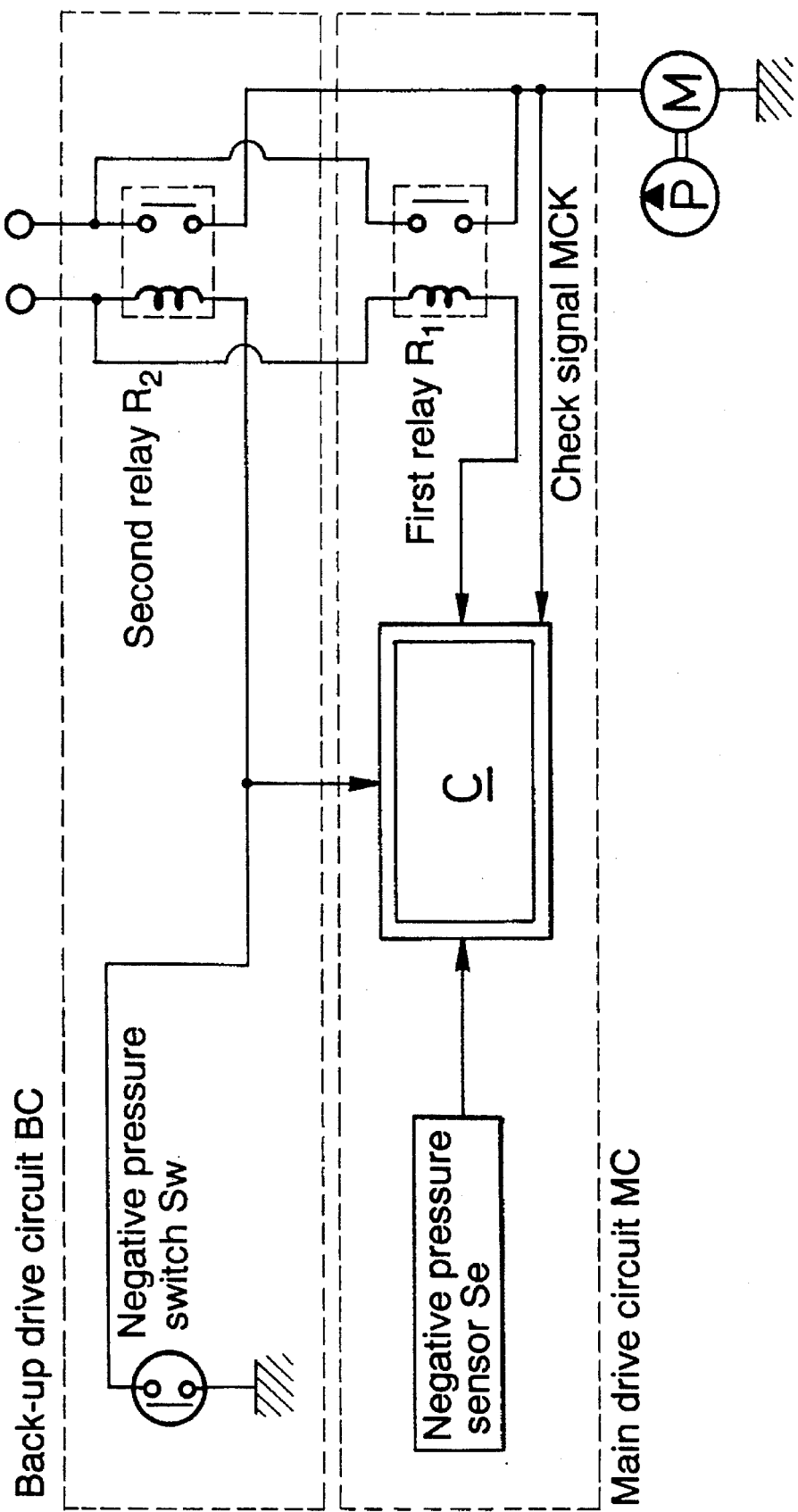
FIG. 2 is a diagram illustrating a circuit arrangement of a control system for an electric pump.

As shown in FIG. 2, the motor M for driving the electric pump P is connected to a power supply through a first relay $R_1$ and a second relay $R_2$ which are connected in parallel. Therefore, when at least one of the first and second relays $R_1$ and $R_2$ is turned ON, the motor M is rotated to drive the electric pump P. The first relay $R_1$ is connected to the control device C which turns the first relay $R_1$ ON or OFF based on an output signal from the negative pressure sensor Se and a check signal MCK (which will be described hereinafter) to control the operation of the electric pump P. The second relay $R_2$ is connected to the negative pressure switch Sw. The operation of the electric pump P is controlled by directly turning the second relay $R_2$ ON or OFF based on an output signal from the negative pressure switch Sw. During operation of the motor M (i.e., during operation of the electric pump P), the check signal MCK is applied to the control device C.

The negative pressure switch Sw and the second relay $R_2$ constitute a back-up drive circuit BC as a first drive circuit. And the control device C, the negative pressure sensor Se and the first relay $R_1$ constitute a main drive circuit MC as a second drive circuit.

Figure 3:
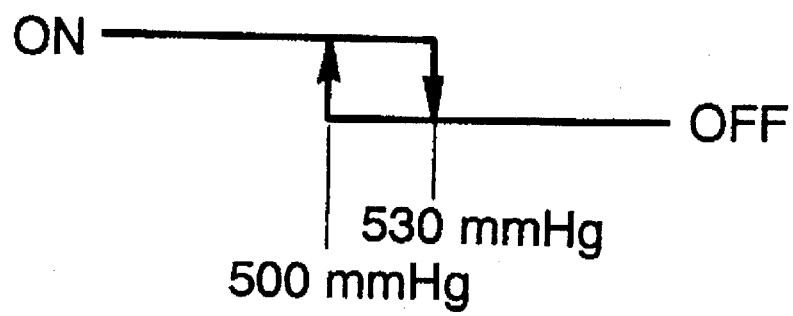
FIG. 3 is a graph illustrating the characteristic of a negative pressure switch.

FIG. 3 illustrates an ON/OFF characteristic of the negative pressure switch Sw. The negative pressure switch Sw has a hysteresis characteristic in which when the negative pressure in the accumulator AC is reduced down to 500 mmHg, the negative pressure switch Sw is turned ON, and when the negative pressure in the accumulator AC is increased up to 530 mmHg, the negative pressure switch Sw is turned OFF. Each of such pressure values indicates the magnitude of negative pressure, and as such if the numerical value is larger, the negative pressure is larger (i.e., a lower pressure).

The control of the electric pump P will be described below with reference to a timing chart shown in FIG. 4.

If the negative pressure in the accumulator AC is reduced down to 500 mmHg to turn the negative switch Sw ON, the back-up drive circuit BC is turned ON, thereby turning the second relay $R_2$ ON to drive the electric pump P. When the electric pump P has been driven, the check signal MCK is supplied to the control device C. After a lapse of a predetermined very short time represented by $T_1$ from the reception of the check signal MCK, the control device C turns ON the main drive circuit MC, thereby turning ON the first relay $R_1$. Therefore, during a period from the turning-ON of the negative switch Sw to drive the electric pump P by the back-up drive circuit BC up to the lapse of such time $T_1$, the electric pump P is driven only by the back-up drive circuit BC, and after the lapse of the time $T_1$, the electric pump P is driven by both of the back-up drive circuit BC and the main drive circuit MC.

When the negative pressure in the accumulator AC has been increased up to 530 mmHg by the operation of the electric pump P, the negative switch Sw is turned OFF to turn OFF the back-up drive circuit BC. If it is detected by the negative sensor Se that the negative pressure in the accumulator AC has been further increased to reach 600 mmHg, the main drive circuit MC is turned OFF to turn OFF the first relay $R_1$, and as a result, the driving of the electric pump P is stopped. If the negative pressure in the accumulator AC is thereafter reduced down to 500 mmHg, the negative switch Sw is turned ON to drive the electric pump P. Therefore, during a period of a time $T_2$, the electric pump P is driven only by the main drive circuit MC.

The control of the electric pump P will be further described with reference to flow charts shown in FIG. 5 to 8.

First, in a main routine shown in FIG. 5, if the electric pump P has been driven and the check signal MCK is ON at step S1, a negative pressure value Pb detected by the negative pressure sensor Se is compared with 600 mmHg. If Pb≦600 mmHg (i.e., if the negative pressure in the accumulator AC is equal to or less than 600 mmHg with an insufficient depressurization), the processing is passed to step S3, at which step the first relay $R_1$ is directly turned ON, thereby continuing the driving of the electric pump P. On the other hand, if Pb>600 mmHg at step S2 (i.e., if the negative pressure in the accumulator AC is larger than 600 mmHg with a sufficient depressurization), the processing is passed to step S4, at which step the first relay $R_1$ is turned OFF, thereby stopping the driving of the electric pump P.

When the driving of the electric pump P has been stopped by turning OFF the first relay $R_1$ at step 4, the check signal MCK is turned OFF at step S1 in a next loop, and the first relay $R_1$ is retained in its OFF state at step S4. When the negative pressure in the accumulator AC is reduced by the stopping of the electric pump P, the negative pressure switch Sw is soon turned ON to drive the electric pump P, whereby the check signal MCK is turned ON at step S1. The above description is as given with reference to the timing chart in FIG. 4.

Then, at step Sw, the diagnosis of a trouble is carried out for the negative pressure switch Se, the negative pressure sensor Se, the main drive circuit MC and the back-up drive circuit BC. If it is diagnosed at step S6 that there is any trouble, the processing is advanced to step S7, at which a fail-safe made 8 operation is carried out.

A subroutine for step S5 in the flow chart shown in FIG. 5 will be described with reference to a flow chart (a trouble diagnosis routine) shown in FIG. 6 and 7.

First, when the negative pressure switch Sw has been turned ON at step S11, if in a normal state, the second relay $R_1$, must be turned ON to drive the electric pump P, and the check signal MCK must be turned ON. However, if the check signal MCK remains OFF at step S12 (i.e., if the electric pump P is not driven), it is judged at step S13 that there is "an OFF trouble of the back-up drive circuit."

On the other hand, when the check signal MCK has been turned ON at step S12 to drive the electric pump P, if in a normal state, the negative pressure value Pb detected by the negative pressure sensor Se must be smaller than 600 mmHg (if the negative pressure value Pb becomes equal to or more than 600 mmHg, the first relay $R_1$ is turned OFF to stop the electric pump P). Nevertheless, if Pb≧600 mmHg at next step S14, at least one of the negative pressure sensor Se and the negative pressure switch Sw is in trouble, and it is judged at step S15 that there is "an unmatched trouble 1 of the negative pressure sensor Se and/or the negative pressure switch Sw."

When the negative pressure switch Sw has been turned OFF, the processing is advanced to step S16, at which it is judged whether Pb is smaller than 450 mmHg. If in the normal state, Pb=500 mmHg and the negative pressure switch Sw must be turned ON. But when the negative switch Sw is not turned ON even if the negative pressure value Pb is reduced down to 450 mmHg or less, at least one of the negative pressure sensor Se and the negative pressure switch Sw is in trouble, and it is judged at step S17 that there is "an unmatched trouble 2 of the negative pressure sensor Se and/or the negative pressure switch Sw."

When the negative pressure value Pb is equal to or more than 450 mmHg at step S16, if it is judged at step S19 that the check signal MCK has been turned OFF (i.e., if the electric pump P is not driven), notwithstanding that it is judged at step S18 that the first relay $R_1$ has been turned ON, it is judged at step S20 that there is a trouble in the main drive circuit MC and hence, there is "an OFF trouble of the main drive circuit."

Then, at steps S21 to S27, it is judged whether there is an abnormality in the negative pressure sensor Se. This will be described in detail. When it is judged at step S21 that the negative pressure switch Sw has been turned ON and if a switch flag SWFLG still remains "0" (zero) at step S22, it is judged that the negative switch Sw has been changed from its OFF state to its ON state in this loop, and the current negative pressure value Pb detected by the negative pressure sensor Se is set at $PB_{LO}$ (a value of switchover of the negative switch from the OFF state to the ON state) and the switch flag SWFLG is set at "1" at step S23. On the other hand, when it is judged at step S21 that the negative pressure switch Sw has been turned OFF and if the switch flag SWFLG still remains "1" at step S24, it is judged that the negative pressure switch Sw has been switched from the ON state to the OFF state. The current negative pressure value Pb detected by the negative pressure sensor Se is set at $Pb_{HI}$ (a value of switchover of the negative pressure switch from the ON state to the OFF state) and the switch flag SWFLG is set at "0" at step S25.

When the $Pb_{LO}$ and $Pb_{HI}$ have been determined in the above manner, it is judged at step S26 whether a value of $Pb_{HI}-PB_{LO}$ is in a range between 20 mmHg and 40 mmHg. As described above, the negative pressure switch Sw is designed such that it is turned ON at 500 mmHg and turned OFF at 530 mmHg, and its hysteresis must be 30 mmHg. However, if such hysteresis is equal to or less than 20 mmHg or equal to or more than 40 mmHg with an error exceeding 10 mmHg at step S26, it is judged at step S27 that there is "an abnormality in the negative pressure sensor."

In this way, the use of an analog sensor as the negative pressure sensor Se makes it possible to easily detect a break trouble or a short-circuit trouble of the negative pressure sensor Se by monitoring an output value from such sensor.

Figure 6:
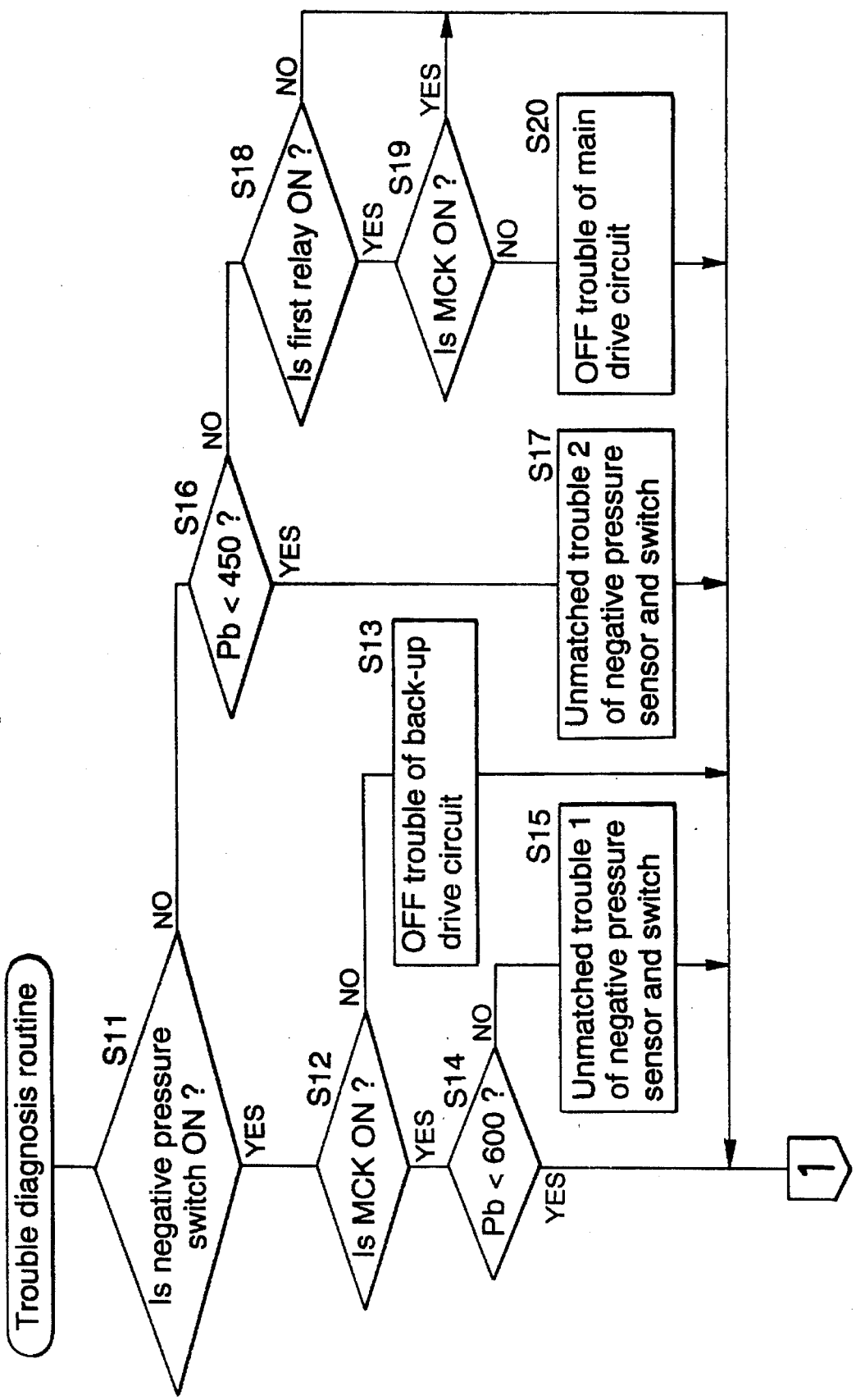
FIG. 6 is a first portion of a flow chart of a subroutine of step S5 in the main routine.

When a trouble has been detected in the trouble diagnosis routine shown in FIGS. 6 and 7, a fail-safe mode routine shown in FIG. 8 is carried out.

In the fail-safe mode routine, first, an alarm lamp is turned ON at step S31 to provide an alarm indicative of the fact that a trouble has been generated. Then, if the electric pump P is not driven, i.e., there is "ran OFF trouble of the back-up drive circuit" at step S32 even if the negative pressure switch Sw has been turned ON, or if the negative pressure switch Sw is not turned ON, i.e., there is "an unmatched trouble 2 of the negative pressure sensor Se and/or the negative pressure switch Sw" at step S33, notwithstanding that the negative pressure value Pb detected by the negative pressure sensor Se is equal to or less than 450 mmHg, the first relay $R_1$ is forcedly ON/OFF-controlled.

Figure 9:
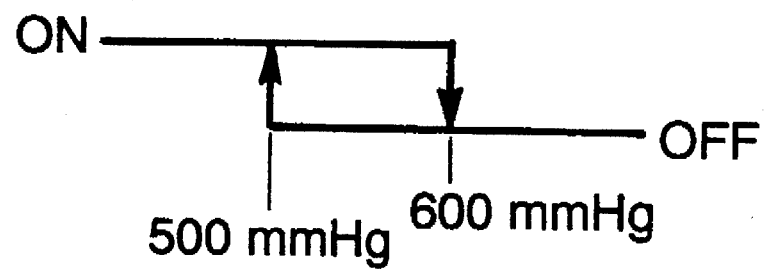
FIG. 9 is a graph illustrating the driving characteristic of the electric pump when there is a trouble produced.

More specifically, as shown in FIG. 9, if the negative pressure value Pb becomes smaller than 500 mmHg, the first relay $R_1$ is turned ON to drive the electric pump P, and if the negative pressure value Pb becomes larger than 600 mmHg, the first relay $R_1$ is turned OFF to stop the driving of the electric pump P. Thus, even if either "the OFF trouble of the back-up drive circuit" or "the unmatched trouble 2 of the negative pressure sensor Se and/or the negative pressure switch Sw" is generated, the controlling of the electric pump P can be continued without any trouble.

On the other hand, if the trouble is not either "the OFF trouble of the back-up drive circuit" or "the unmatched trouble 2 of the negative pressure sensor Se and/or the negative pressure switch Sw," i.e., if the trouble is "the OFF trouble of the main drive circuit," "the unmatched trouble 1 of the negative pressure sensor Se and/or the negative pressure switch Sw" or "the abnormality of the negative pressure sensor," the processing is advanced to step S37, at which the first relay $R_1$ is turned OFF. In this case, the controlling of the electric pump P can be continued without hindrance by turning the second relay $R_2$ ON or OFF based on the turning-ON or -OFF of the negative pressure switch Sw of the back-up drive circuit BC.

For the time $T_1$ in the timing chart shown in FIG. 4, the electric pump P is being driven only by the back-up drive circuit BC based on the output signal from the negative pressure switch Sw and therefore, the trouble of the back-up drive circuit BC can accurately be diagnosed (see step S13 in FIG. 6) by comparing the output signal from the negative pressure switch Sw and the check signal MCK with each other within the time $T_1$. In addition, for the time $T_2$, the electric pump P is being driven only by the main drive circuit MC based on the signal from the negative pressure sensor Se and therefore, the trouble of the main drive circuit MC can be accurately diagnosed (see step S20 in FIG. 6) by comparing the output signal from the negative pressure sensor Se and the check signal MCK with each other within the time $T_2$. Moreover, during one driving run of the electric pump P (i.e., from ON to OFF), the time $T_1$ and the time $T_2$ are necessarily generated or included and therefore, a trouble can be quickly detected.

Although the embodiment of the present invention has been described in detail, it will be understood that the present invention is not limited to the above-described embodiment, and various modifications in design may be made without departing from the spirit and scope of the invention defined in claims.

For example, the accumulator AC has been used as the negative pressure source in the embodiment, but the present invention is applicable with an accumulator as a high pressure source. The present invention is also applicable with a liquid pump rather than a gas pump. In addition, the single negative pressure switch Sw and the single negative pressure sensor Se have been used in the embodiment, but two negative pressure switches or two negative pressure sensors can be used.

What is claimed is:

1. An electric pump control system, comprising:

an electric pump for pumping a fluid;

an accumulator connected to said electric pump;

a first pressure detecting means for detecting a pressure in said accumulator;

a second pressure detecting means for detecting a pressure in said accumulator;

a first drive circuit for directly driving and stopping said electric pump based on an output signal from said first pressure detecting means; and a second drive circuit for driving and stopping said electric pump based on an output signal from said second pressure detecting means and an output signal from a control means which has a trouble detecting function; wherein a timing of starting and stopping driving of said electric pump by said second drive circuit is different from a timing of starting and stopping driving of said electric pump by said first drive circuit, thereby providing, during one driving operation of the electric pump from starting driving to stopping driving, which is between a time when said electric pump is started to be driven to a time when said electric pump is first stopped, a time period during which said electric pump is being driven only by said first drive circuit and a time period during which said electric pump is being driven only by said second drive circuit.

2. An electric pump control system according to claim 1, wherein said control means is supplied with an output signal from said first pressure detecting means and a check signal indicative of a command to judge the driving and stopping of said electric pump.

3. An electric pump control system according to claim 1, wherein at least one of said first and second pressure detecting means is an analog sensor.

4. An electric pump control system, comprising:

an electric pump for pumping a fluid;

an accumulator connected to said electric pump;

a first pressure responsive means in communication with said accumulator;

a second pressure responsive means in communication with said accumulator;

a first drive circuit including said first pressure responsive means for starting an ON operation driving of said electric pump at a minimum pressure;

a second drive circuit including said second pressure responsive means for stopping said electric pump at a maximum pressure; and said first and second drive circuits including means for causing said first drive circuit to discontinue the ON operation driving of said electric pump before said maximum pressure is reached but after said second drive circuit starts controlling the ON operation driving of said electric pump for producing a period of time of concurrent ON operation driving of said electric pump by both said drive circuits.

5. An electric pump control system according to claim 4 further including means for separately determining a trouble in the operation of each said pressure responsive means.

6. An electric pump control system according to claim 4, wherein said first and second drive circuits include timer means for initiating the ON operation driving of said electric pump by said second drive circuit a predetermined time after said starting the ON operation driving of said electric pump by said first drive circuit.

7. An electric pump control system according to claim 5, wherein said first drive circuit includes means for discontinuing the ON operation driving of said electric pump at a predetermined pressure less than said maximum pressure.

8. An electric pump control system according to claim 5, wherein said first and second drive circuits include timer means for initiating the ON operation driving of said electric pump by said second drive circuit a predetermined time after said starting of the ON operation driving of said electric pump by said first drive circuit.

9. An electric pump control system according to claim 8, wherein said first drive circuit includes means for discontinuing the ON operation driving of said electric pump at a predetermined pressure less than said maximum pressure.

* * * * *